US 11,554,481 B2

(12) United States Patent
Kato

(10) Patent No.: US 11,554,481 B2
(45) Date of Patent: Jan. 17, 2023

(54) WORKPIECE TRANSPORT APPARATUS

(71) Applicant: Fanuc Corporation, Yamanashi (JP)

(72) Inventor: Yoshiaki Kato, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 236 days.

(21) Appl. No.: 16/904,891

(22) Filed: Jun. 18, 2020

(65) Prior Publication Data
US 2020/0406452 A1   Dec. 31, 2020

(30) Foreign Application Priority Data

Jun. 26, 2019  (JP) .............................. JP2019-118984

(51) Int. Cl.
| | | |
|---|---|---|
| *B25J 9/12* | (2006.01) | |
| *B25J 13/08* | (2006.01) | |
| *B25J 9/16* | (2006.01) | |
| *B25J 15/06* | (2006.01) | |

(52) U.S. Cl.
CPC .............. *B25J 9/12* (2013.01); *B25J 9/1653* (2013.01); *B25J 9/1679* (2013.01); *B25J 13/087* (2013.01); *B25J 15/0616* (2013.01)

(58) Field of Classification Search
CPC . B25J 9/12; B25J 9/1653; B25J 9/1679; B25J 13/087
See application file for complete search history.

(56) References Cited

U.S. PATENT DOCUMENTS

2019/0084157 A1\*  3/2019  Goerg ................... B25J 9/1612
2019/0143521 A1\*  5/2019  Gawlik .............. G05B 23/0232
                                                              702/81

FOREIGN PATENT DOCUMENTS

| JP | 06008098 A | | 1/1994 |
| JP | 2014155965 A | \* | 8/2014 |

OTHER PUBLICATIONS

JP_2014155965_A_English_Translation (Year: 2014).\*

\* cited by examiner

*Primary Examiner* — Khoi H Tran
*Assistant Examiner* — Aaron G Cain
(74) *Attorney, Agent, or Firm* — RatnerPrestia

(57) ABSTRACT

A workpiece transport apparatus for transporting a workpiece includes: a hand device; a moving device that includes a movable part mounted with the hand device and that includes at least one drive axis configured to operate the movable part; a current measurement section configured to measure a current value of a motor that drives the drive axis; and a workpiece number detection section configured to detect that a number of workpieces held by the hand device is different from an expected number based on a comparison result between the current value measured by the current measurement section when the hand device holds the workpiece, and a predetermined threshold value.

5 Claims, 3 Drawing Sheets

WORKPIECE TRANSPORT APPARATUS

CROSS-REFERENCE TO RELATED APPLICATIONS

This application is a new U.S. Patent Application that claims benefit of Japanese Patent Application No. 2019-118984, filed Jun. 26, 2019, the disclosure of which is incorporated herein by reference in its entirety for all purposes.

BACKGROUND OF THE INVENTION

1. Field of the Invention

The present invention relates to a workpiece transport apparatus.

2. Description of the Related Art

There is a known workpiece transport apparatus for taking out workpieces one by one from stacked sheet-like workpieces by using a robot mounted with a hand device and transporting the workpiece to the next process. JP 06-008098 A describes a one-sheet taking-out apparatus for a plate material. This one-sheet taking-out apparatus has a configuration in which "one plate material is sucked to a sucking member, the position of a holding member of the plate material is measured by a position recognition member provided in the holding member, and after the data are stored, a transport body sucks another plate material and simultaneously the position of the holding member is measured by the position recognition member, the measured data is compared with the measured data of the one plate material, and when the values are the same, the plate material is moved without stopping the operation of the transport body." (Paragraph 0007).

SUMMARY OF THE INVENTION

In a transport apparatus provided with a robot, detection of duplicate taking-out of workpieces such as a sheet material is generally performed by a technique in which a dedicated sensor for detecting double taking-out of workpieces is mounted in a hand device or by a technique in which a check station where a dedicated sensor is disposed is provided on a transport path of the robot. However, such dedicated sensors are generally expensive. There is a need for a workpiece transport apparatus capable of detecting duplicate taking-out of workpieces at a lower cost without requiring a dedicated sensor for detecting the duplicate taking-out of workpieces.

A workpiece transport apparatus for transporting a workpiece includes: a hand device; a moving device that includes a movable part mounted with the hand device and that includes at least one drive axis configured to operate the movable part; a current measurement section configured to measure a current value of a motor that drives the drive axis; and a workpiece number detection section configured to detect that a number of workpieces held by the hand device is different from an expected number based on a comparison result between the current value measured by the current measurement section when the hand device holds the workpiece, and a predetermined threshold value.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
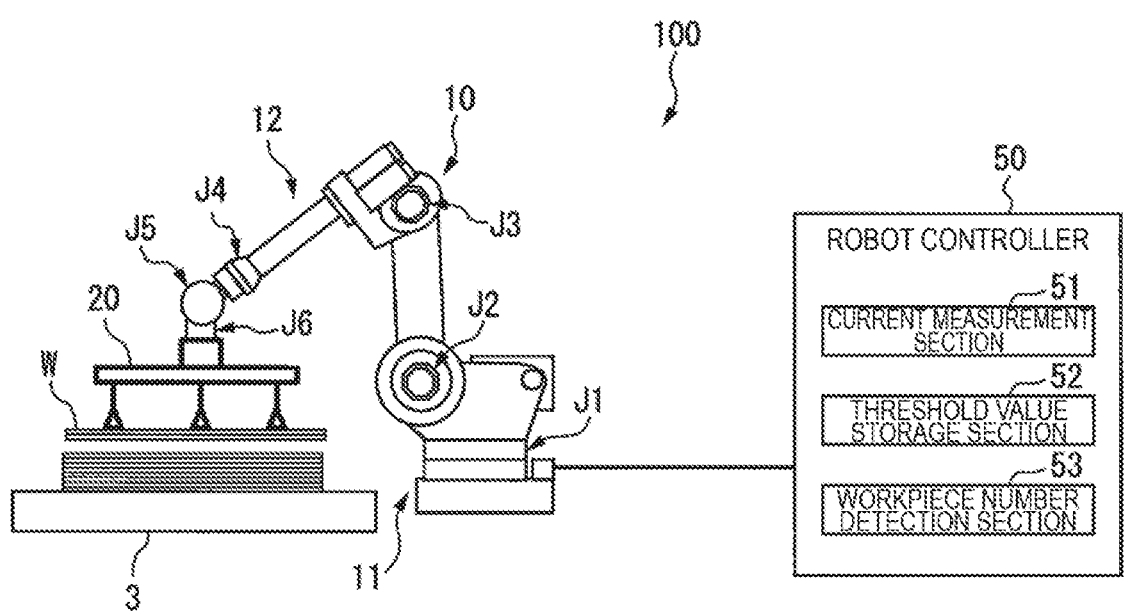
FIG. 1 is a diagram illustrating a configuration of a workpiece transport apparatus according to an embodiment.

Embodiments of the present disclosure will be described below with reference to the accompanying drawings. Throughout the drawings, corresponding components are denoted by common reference numerals. In order to facilitate understanding, the scale of these drawings is appropriately changed. The embodiments illustrated in the drawings are examples for implementing the present invention, and the present invention is not limited to the embodiments illustrated in the drawings.

FIG. 1 is a diagram illustrating a configuration of a workpiece transport apparatus 100 according to an embodiment. As illustrated in FIG. 1, the workpiece transport apparatus 100 includes a robot 10 mounted with a hand device 20, and a robot controller 50 configured to control the operation of the robot 10. The hand device 20 is attached to an arm tip of the robot 10. The hand device 20 is, as an example, a suction type hand device. The robot 10 is a 6-axis vertical articulated robot in the present embodiment, but other types of robots may be used. The robot 10 includes a base 11 fixed to an installation surface and an arm 12 as a movable part mounted with the hand device 20. The robot 10 is provided with 6 drive axes, namely, an axis J1, an axis J2, an axis J3, an axis J4, an axis J5, and an axis J6, in this order from the base 11 side.

A robot controller 50 controls a movement of a predetermined movable part (e.g., the arm tip) of the robot 10 by driving and controlling servomotors disposed on the drive axes of the robot 10. The robot controller 50 may have a general computer configuration including a CPU, a ROM, a RAM, a storage device, a communication interface, an operation section, a display section, etc. Under the control of the robot controller 50, the robot 10 executes the operation of taking out sheets one by one from the top side of the multiple sheet-like workpieces W stacked on a table 3 and transporting them to the next process. Hereinafter, the sheet-like workpiece W may be simply referred to as a workpiece W.

In order to prevent transporting the workpieces W to the next process in a state in which another workpiece W is sticking to the lower side of the workpiece W to be originally transported by the hand device 20 (a state of the so-called double taking-out or duplicate taking-out of workpieces, hereinafter such a state will be described as duplicate taking-out of workpieces), the robot controller 50 is configured to detect duplicate taking-out of the workpieces W as described below. The workpiece W includes not only a sheet material but also, regardless of material, various workpieces which may be in a state of duplicate taking-out during transporting by the hand device 20. The robot controller 50 is configured to detect not only duplicate taking-out of workpieces but also a state in which the hand device 20 transports workpieces W, the number of which is different from the originally intended number.

As illustrated in FIG. 1, the robot controller 50 includes a current measurement section 51, a threshold value storage section 52, and a workpiece number detection section 53. The current measurement section 51 measures a current value of a servomotor of each of the axes J1 to J6 of the robot 10 or current values of servomotors of predetermined axes among the axes J1 to J6 used for detecting duplicate taking-out of workpieces. The current value can be obtained from a current feedback signal in servo control for a servomotor in the robot controller 50. The current value of the servomotor represents the load torque of the servomotor. Therefore, the robot controller 50 can obtain the load torque applied to the axis by measuring the current value of the servomotor of the axis. The threshold value storage section 52 stores a threshold value for determining whether the current value (load torque) of the axis is a normal value or a value representing the state of duplicate taking-out of workpieces. As an example, the threshold value storage section 52 stores, as threshold values, the current values (load torque) of the servomotors of the axes J1 to J6 when the robot 10 performs a predetermined operation while holding one sheet of workpiece W, which is the normal number of sheets, or the current value of the servomotor of a predetermined axis used for detecting duplicate taking-out of workpieces. The threshold value may be set in advance in the robot controller 50, or may be input to the robot controller 50 via an operation section of the robot controller 50 or via a network from outside.

The workpiece number detection section 53 detects that the number of workpieces W held by the hand device 20 is different from the expected number based on a comparison result between a current value measured by the current measurement section 51 when the hand device 20 holds the workpiece W, and a threshold stored in the threshold value storage section 52. For example, when the measured current value exceeds the threshold value, the workpiece number detection section 53 can detect that the state of duplicate taking-out of workpieces has occurred. The target drive axis for measurement of current value for detecting duplicate taking-out may be selected in any of the following manners. In this case, the target drive axis for measurement may be selected by the current measurement section 51.

(r1) All drive axes of the robot are targeted for measurement of a current value.

(r2) According to the posture of the robot, a drive axis in which a change in current value is likely to be noticeable during duplicate taking-out of workpieces is selected as a target for measurement.

(r3) A basic axis (the axis J2 or J3 in the case of the robot 10) is always targeted for measurement regardless of the posture or the like of the robot.

(r4) When a control section for executing servo control of the drive axes of the robot controller 50 has a function as a disturbance observer for detecting disturbance torque (vibration, collision, etc.), the accuracy of detection of duplicate taking-out of workpieces may be improved by, for example, a method such as excluding, from the target for measurement, a drive axis for which the disturbance observer detects disturbance.

Figure 2:
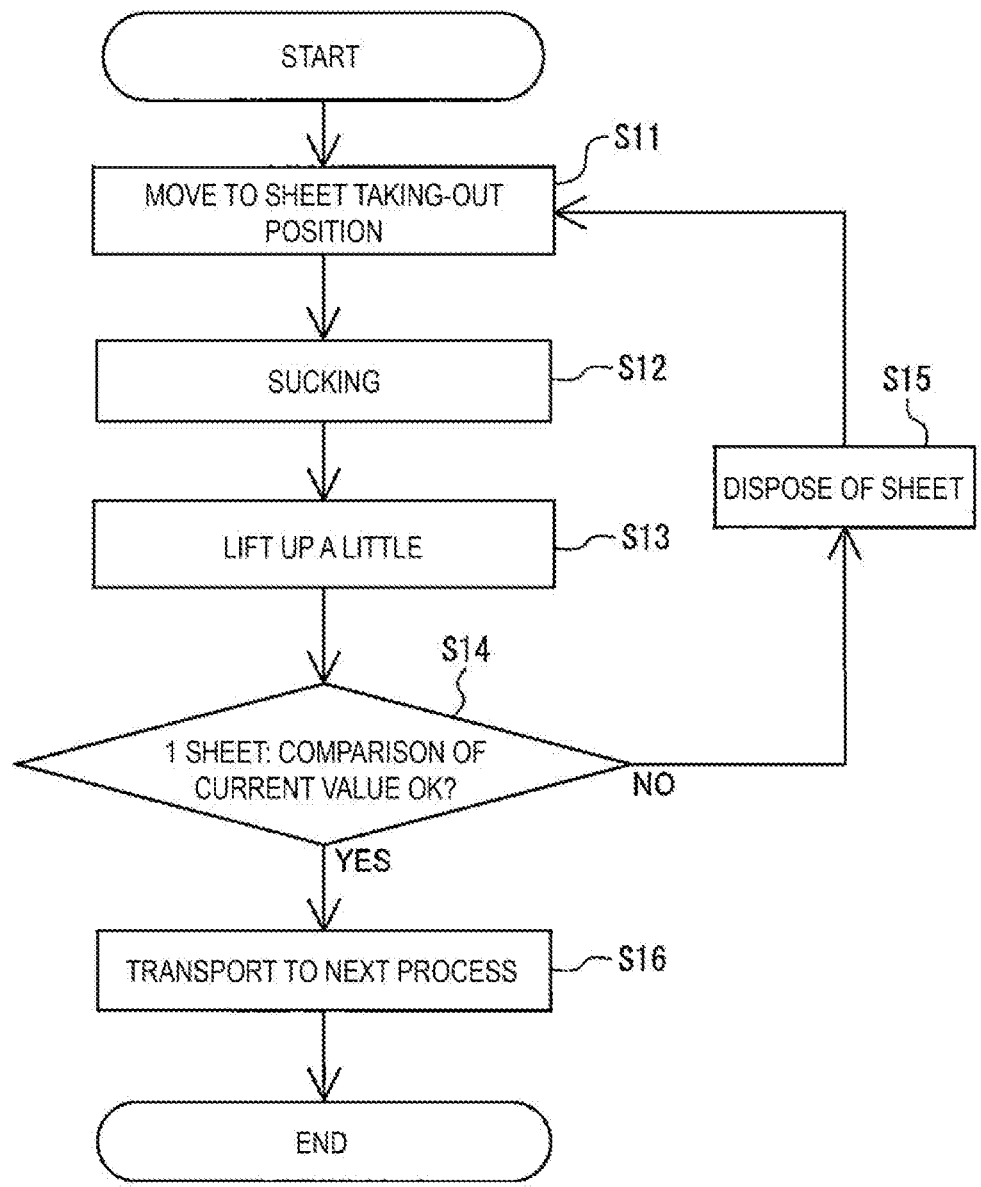
FIG. 2 is a flowchart illustrating detection processing for duplicate taking-out of workpieces.

FIG. 2 is a flowchart illustrating detection processing of duplicate taking-out of workpieces executed under the control of a CPU of the robot controller 50. Here, as an example, a case will be described in which target drive axes for measurement of the current value to detect duplicate taking-out of workpieces are the axes J2 and J3, which are basic axes. In this case, the threshold value storage section 52 stores the current values of the servomotors of the axes J2 and J3 as thresholds when the hand device 20 holding one workpiece W performs a predetermined operation (lift-up operation at a constant speed in the present example). When the processing for detecting duplicate taking-out of workpieces is started in response to a predetermined operation being conducted on the robot controller 50, the robot controller 50 first moves the robot 10 (arm tip) to a position above the workpiece W stacked on the table 3, which is a sheet taking-out position (step S11). Next, the robot controller 50 controls the hand device 20 to suck one sheet of workpiece W at the top of the stacked workpiece W (step S12).

Next, the robot controller 50 performs an operation of lifting up the hand device 20 by a small distance at a constant speed (step S13). The current measurement section 51 measures the current values of the servomotors of the axes J2 and J3 while the hand device 20 is being lifted up, and compares the measured current values with the threshold values (i.e., the current values of the servomotors of the axis J2 and axis J3 when the hand device 20 holds one sheet of workpiece W while performing the lift-up operation) of the axis J2 and the axis J3 (step S14). Specifically, in step S14, the detection of duplicate taking-out of workpieces can be performed by the following determination rules m1 and m2. In this case, the measured values of the current values of the axes J2 and J3 are denoted by $I_2$ and $I_3$, respectively. The thresholds of the axes J2 and the J3 are denoted by $Th_2$ and $Th_3$, respectively.

(m1) When the current values of the servomotors of the axes J2 and J3 are lower than or equal to their thresholds $Th_2$ and $Th_3$ (i.e., when $I_2 \leq Th_2$ and $I_3 \leq Th_3$ are satisfied), it is determined that the servomotors are operating normally (one workpiece W is transported) (S14: YES).

(m2) When any one of the following is satisfied, it is detected that duplicate taking-out of workpieces has occurred.

(m2-1) when $I_2 > Th_2$ or $I_3 > Th_3$ is satisfied.

(m2-2) when $I_2 > Th_2$ and $I_3 > Th_3$ are satisfied.

Which of the rules (m2-1) and (m2-2) should be adopted may be determined in advance by experiment using an actual workpiece W.

When the determination result is NG, that is, when duplicate taking-out of workpieces is detected (S14: NO), the robot controller 50 disposes of the workpieces W held by the hand device 20 to a predetermined space (step S15), and moves the hand device 20 to the sheet taking-out position again by operating the robot 10. On the other hand, when the current comparison result is determined to be OK in step S14, that is, when the duplicate taking-out of workpieces has not occurred (S14: YES), the robot controller 50 controls the robot 10 to transport the workpiece W to the next process (step S16). As a result of the above processing, the workpiece W is prevented from being transported to the next process in a state of duplicate taking-out of workpieces.

There are various operation examples as indicated below regarding determination of the kind of operation of the robot 10 during which the current value (processing of step S14 in FIG. 2) should be measured for detecting duplicate taking-out of workpieces.

(Operation example 1) Operation of lifting up the hand device vertically upward (corresponding to FIG. 2).

(Operation example 2) Operation of keeping the workpiece stationary after lifting up the workpiece with the hand device.

The above Operation example 1 has an advantage that it is possible to detect duplicate taking-out of workpieces while actually performing transport work. The above Operation example 2 has a possible advantage of being able to perform more accurate detection.

Figure 3:
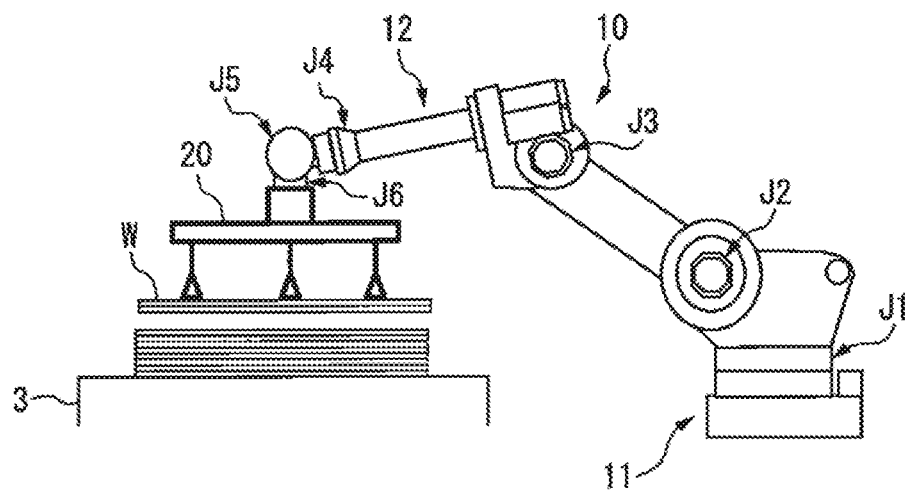
FIG. 3 is a diagram for explaining an example in which a target drive axis for measurement of a current value is selected according to a posture of a robot.

Next, a specific example in the case where the target drive axis for measurement of the current value is selected according to the posture of the robot 10 (the method of the above rule (r2)) will be described with reference to FIG. 3 and FIG. 4. FIG. 3 illustrates a state in which the posture of the robot 10 is extended. For example, the robot 10 may be determined to be in the state in which the posture is extended when the angle between the links connected to the axis J2 and the angle between the links connected to the axis J3 exceed a predetermined angle. In the case of the posture illustrated in FIG. 3, the axes J2 and J3, which are the basic axes, receive a greater load than the others of the axes J1 to J6. In this case, among the axes J1 to J6, the axis J2 or the axis J3 can be regarded as the axis in which the difference is the greatest between the current value when the hand device 20 holds the expected number of workpieces and the current value when the hand device 20 holds a different number of workpieces W from the expected number. Therefore, in such a posture, the axis J2 and the axis J3 are selected as the target drive axes for measurement of the current value for detecting duplicate taking-out of workpieces.

Figure 4:
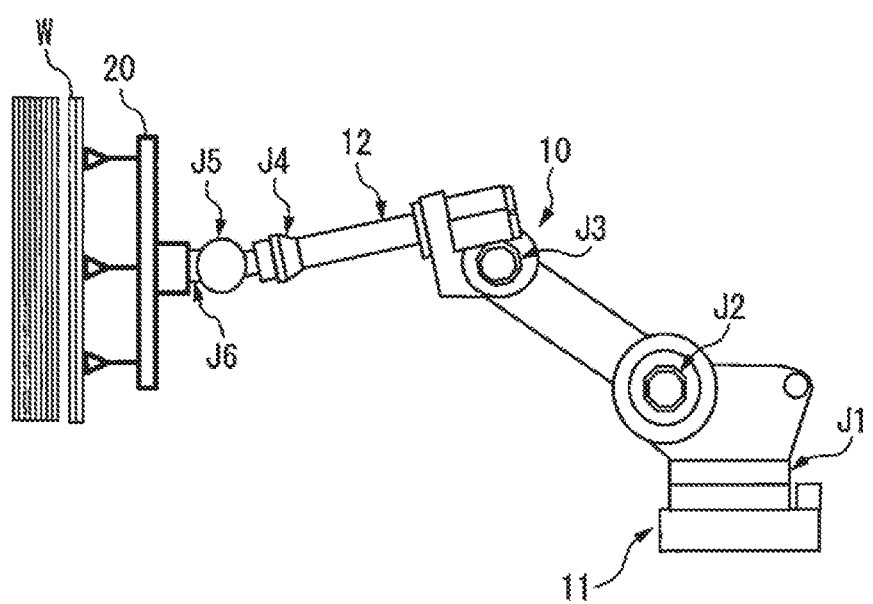
FIG. 4 is a diagram for explaining another example in which a target drive axis for measurement of a current value is selected according to a posture of a robot.

FIG. 4 illustrates an example of a posture in which a large load is applied to the wrist axis (axis J5) and the basic axis (axis J2 and axis J3). In the example of FIG. 4, the posture of the robot 10 as a whole is extended, and the tip of the wrist (axis J5) is rotated upward by about 90 degrees as compared with the state of FIG. 3, so that the wrist (axis J5) is placed under a larger load. In this case, among the axes J1 to J6, the axis J2, the axis J3, or the axis J5 can be regarded as the axis in which the difference is the greatest between the current value when the hand device 20 holds the expected number of workpieces and the current value when the hand device 20 holds the workpieces W, the number of which is different from the expected number. Therefore, in the case of the state illustrated in FIG. 4, the axes J2, J3, and J5 are selected as the target drive axes for measurement to detect duplicate taking-out of workpieces. Moreover, information (table) defining the correspondence between the posture of the robot 10 and the target drive axes for measurement of the current value may be preset in the robot controller 50.

According to the above-mentioned method, a drive axis (i.e., an axis of which a current value is likely to differ between a normal state and a state in which duplicate taking-out of workpieces has occurred) effective for detecting duplicate taking-out of workpieces can be selected in accordance with the posture of the robot 10.

According to the above configuration, it is possible to detect duplicate taking-out of workpieces at a lower cost without requiring a dedicated sensor for detecting duplicate taking-out of workpieces. Further, according to the present embodiment, it is possible to accurately detect duplicate taking-out of workpieces without depending on the material of the workpiece.

While the present disclosure has been described with reference to specific embodiments, it will be understood, by those skilled in the art, that various changes or modifications may be made thereto without departing from the scope of the following claims.

In the embodiment described above, a robot mounted with a hand device is used as a moving device for transporting a workpiece, but various types of moving devices, including a single-axis moving mechanism, which are provided with a movable part that moves the hand device can be used instead of such a robot.

In the above embodiment, a suction type hand device is used as the hand device for holding the workpiece, but instead of such a suction type hand device, various types of hand devices configured to take out and hold the desired number of sheets from the stacked workpieces can be used.

The invention claimed is:

1. A workpiece transport apparatus configured to transport a workpiece, the workpiece transport apparatus comprising:
   a robot mounted with a hand device;
   an arm of the robot that includes a movable part mounted with the hand device and that includes at least one drive axis configured to operate the movable part; and
   a processor configured to: measure a current value of a motor that drives the drive axis; detect that a number of workpieces held by the hand device is different from an expected number based on a comparison result between the measured current value when the hand device holds the workpiece, and a predetermined threshold value; and detect an abnormality in the number of pieces held by the hand device occurs when the comparison result exceeds the predetermined threshold.

2. The workpiece transport apparatus according to claim 1, wherein
   the arm is an articulated robot including a plurality of the drive axes and a plurality of motors each configured to drive the plurality of the drive axes, and
   the processor selects one or more target drive axes for measurement of the current value among the plurality of the drive axes in accordance with a posture of the articulated robot, and measures the current values of the motors configured to drive the selected one or more target drive axes for measurement among the plurality of motors.

3. The workpiece transport apparatus according to claim 2, wherein
   the one or more target drive axes for measurement are selected to include, among the plurality of motors, a motor having a largest difference in current value between a case where the number of workpieces held by the hand device is the expected number and a case where the number of workpieces held by the hand device is different from the expected number.

4. The workpiece transport apparatus according to claim 2, wherein
   the processor detects that the number of workpieces held by the hand device is different from the expected number based on a comparison result between the current value measured by the processor when the hand device holds the workpiece while the articulated robot performs a predetermined operation, and the predetermined threshold value.

5. The workpiece transport apparatus according to claim 1, wherein
   the predetermined threshold value is a normal current value flowing through the motor measured by the processor when the hand device holds the expected number of workpieces.

* * * * *

UNITED STATES PATENT AND TRADEMARK OFFICE
CERTIFICATE OF CORRECTION

PATENT NO. : 11,554,481 B2
APPLICATION NO. : 16/904891
DATED : January 17, 2023
INVENTOR(S) : Yoshiaki Kato Page 1 of 1

It is certified that error appears in the above-identified patent and that said Letters Patent is hereby corrected as shown below:

In the Claims

Claim 1, Column 6, Line 28: delete "occurs"

Signed and Sealed this
Twenty-fifth Day of April, 2023

Katherine Kelly Vidal
*Director of the United States Patent and Trademark Office*